G. RICHBERGER.
SHIPPING TAG.
APPLICATION FILED MAY 15, 1909.
969,658.
Patented Sept. 6, 1910.
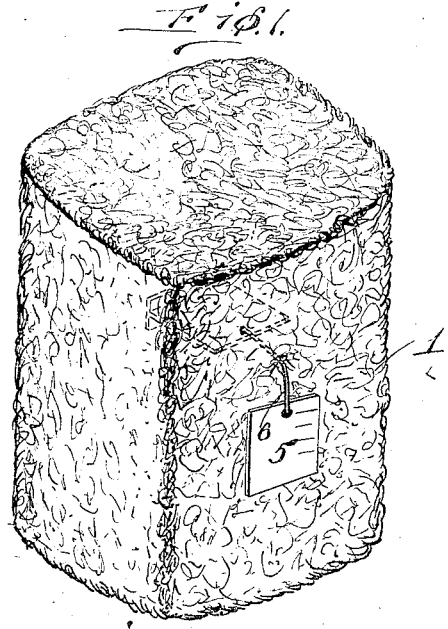
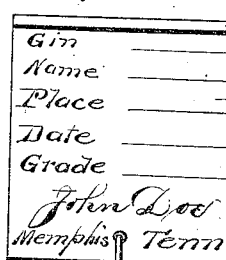
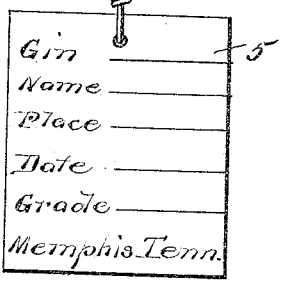
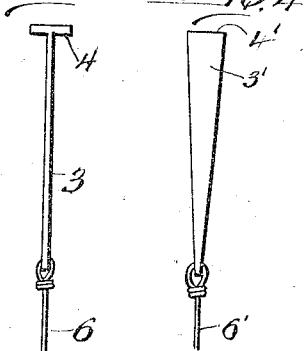
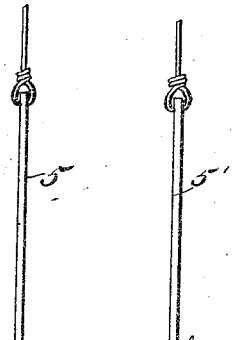
Witnesses
J. M. Fowler Jr.
D. S. Kitchin
Inventor
George Richberger
By Mason Fenwick & Lawrence
his Attorneys

UNITED STATES PATENT OFFICE.

GEORGE RICHBERGER, OF MEMPHIS, TENNESSEE, ASSIGNOR OF ONE-HALF TO H. E. WINTERTON, OF MEMPHIS, TENNESSEE.

SHIPPING-TAG.

969,658.  Specification of Letters Patent. Patented Sept. 6, 1910.

Application filed May 15, 1909. Serial No. 496,098.

*To all whom it may concern:*

Be it known that I, GEORGE RICHBERGER, a citizen of the United States, residing at Memphis, in the county of Shelby and State of Tennessee, have invented certain new and useful Improvements in Shipping-Tags; and I do hereby declare the following to be a full, clear, and exact description of the invention, such as will enable others skilled in the art to which it appertains to make and use the same.

This invention relates to improvements in tags, and particularly to cotton bale tags, and has for an object the arrangement of means which will cause a sufficient part of the tag to remain upon the bale for identification regardless of the rough usage the bale may pass through.

Another object of the invention is the arrangement of a tag having a plurality of members, one of which is formed with means for holding the same in a bale of cotton when placed therein, and the other of which is held in place by a connecting member attached to the first mentioned member.

A still further object of the invention is the arrangement of an identification tag arranged in duplicate and connected with a wire or cord or the like, one of the members being formed with a thickened or enlarged double flanged end, the member having the thickened or enlarged end being packed into the body of the bale, and the other member being adapted to be displayed on the outer surface of the bale.

With these and other objects in view the invention comprises certain novel constructions, combinations and arrangement of parts as will be hereinafter more fully described and claimed.

In the accompanying drawings: Figure 1 is a perspective view of a bale of cotton with the tag in place. Fig. 2 is a plan view of the tag embodying the invention. Fig. 3 is an edge view of the structure shown in Fig. 2. Fig. 4 is an edge view of a slightly modified form of tag.

Referring to the drawings by numerals, 1 indicates a bale of cotton or other material, to which is connected the tag embodying the invention. The tag is formed in duplicate, one member or part 3 being formed with an enlarged T-shaped end 4, and the other part 5 being formed of flat material of any desired kind, as for instance tin, sheet iron, leather, or paper. Connected to the part 3, which may also be constructed of tin or the like is a wire or cord of any desired kind 6, which is also connected to part 5. Parts 3 and 5 are designed to contain the same information so that after part 3 has been placed in the bale, either during the time that it is being packed or afterward as shown in Fig. 1, part 5 will be left hanging outside of the bale and free for inspection. Ordinarily the part 5 of the tag will remain with the bale for proper identification, but if through any cause, as for instance rough usage, part 5 should be torn loose or removed, part 3 will remain in the interior of the bale, and when it is desired to positively identify the bale, part 3 may be removed. By the construction of the enlargement 4 part 3 can not be readily removed, except by opening the bale.

In Fig. 4 will be seen a slightly modified form of the invention, in which part 3' is beveled from one end to the other so as to form a thickened end 4'. This form of member may be used if desired, and is preferably formed of metal. Secured to part 3' is a connecting member 6', as for instance wire, to which is secured an outer duplicate tag 5' containing the same information as tag or part 3'.

It will be observed that as the device is made in duplicate and attached together, as for instance by wire, and one of the parts of the tag is inserted in the body of the bale before packing or during the process of packing, and the other permitted to hang outside, the bale may be easily identified and may be sure of identification even in the event of all outside marks being obliterated. This arrangement of tag will also prevent fraudulent packing, as well as substitution of bales, as any substitution will be immediately detected and any fraudulent packing will also be detected as both tags or parts are provided with identical information, which may be of any character, as for instance the name of the packer.

What I claim is:

A structure of the character described comprising a pair of bale tie tags having duplicate records marked thereon, non-resilient, flexible means permanently uniting said tags to space the tags apart so that one of them may depend from the other, and one of said tags having on one edge a double flange which extends entirely across and away from the opposite sides of said edge, said tag and its flanges adapted to be inserted in the contents of the bale when the same is being packed so that the flanges thereof will be embedded therein, the other tag being adapted to depend from the side of the bale, substantially as specified.

In testimony whereof I affix my signature in presence of two witnesses.

GEORGE RICHBERGER.

Witnesses:
    MIKE WELCH,
    T. K. KIRK.